US007430741B2

(12) United States Patent
Ayachitula et al.

(10) Patent No.: US 7,430,741 B2
(45) Date of Patent: Sep. 30, 2008

(54) APPLICATION-AWARE SYSTEM THAT DYNAMICALLY PARTITIONS AND ALLOCATES RESOURCES ON DEMAND

(75) Inventors: Naga A. Ayachitula, Elmsford, NY (US); Shu-Ping Chang, Shrub Oak, NY (US); James S. Lipscomb, Yorktown Heights, NY (US); Michael Stephen Schwartz, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 961 days.

(21) Appl. No.: 10/761,184

(22) Filed: Jan. 20, 2004

(65) Prior Publication Data

US 2005/0160428 A1 Jul. 21, 2005

(51) Int. Cl.
*G06F 9/46* (2006.01)
*G06F 15/173* (2006.01)

(52) U.S. Cl. .................. 718/104; 718/100; 718/102; 709/225; 709/226

(58) Field of Classification Search ................. 718/100, 718/101, 102, 103, 104, 105; 710/220; 709/220, 709/223, 224, 225, 226; 726/1, 2, 27
See application file for complete search history.

(56) References Cited

U.S. PATENT DOCUMENTS 4,727,487 A    2/1988  Masui et al. ................. 364/300

5,781,736 A *  7/1998  Schmidt ....................... 709/224

(Continued)

FOREIGN PATENT DOCUMENTS

WO    01/84301 A2    11/2001

OTHER PUBLICATIONS

S.Jha and M.Hassan, Java implementation of policy-based bandwidth management, Jul. 2003, vol. 13, International Journal of Network Management, issue4, pp. 249-258.*

(Continued)

*Primary Examiner*—Meng-Ai An
*Assistant Examiner*—Caroline Arcos
(74) *Attorney, Agent, or Firm*—Bruce Clay; Rudolf O. Siegesmund; Gordon & Rees LLP

(57) ABSTRACT

The present invention is an application-aware method for allocating resources to applications based on a set of predefined policies comprising a Resource Allocation Program (RAP). The RAP is application-aware in that the RAP does not arbitrarily allocate resources to requesting applications. Instead, the RAP allocates resources to requesting applications based on predefined policies. The RAP allows a user to define the resource allocation for each policy in a Resource Allocation Table and associate the applications with the policies in a Policy Application Table. When an application requests resources, the RAP looks to the Policy Allocation Table to determine the policy associated with the application and looks to the Resource Allocation Table to determine the permissible amount of resources to allocate to the application associated with the policy. The RAP then allocates the resources to the requesting application.

11 Claims, 4 Drawing Sheets

U.S. PATENT DOCUMENTS

| | | | |
|---|---|---|---|
| 6,272,544 B1 | 8/2001 | Mullen | 709/226 |
| 6,457,008 B1 * | 9/2002 | Rhee et al. | 707/10 |
| 6,799,208 B1 * | 9/2004 | Sankaranarayan et al. | 709/223 |
| 7,137,119 B1 * | 11/2006 | Sankaranarayan et al. | 718/103 |
| 2002/0007389 A1 * | 1/2002 | Jones et al. | 709/104 |
| 2002/0143945 A1 | 10/2002 | Shahabuddin et al. | 709/226 |
| 2002/0169907 A1 * | 11/2002 | Candea et al. | 710/220 |
| 2002/0178263 A1 | 11/2002 | Hreha et al. | 709/226 |
| 2002/0194350 A1 | 12/2002 | Lu et al. | 709/229 |
| 2003/0009580 A1 | 1/2003 | Chen et al. | 709/231 |
| 2003/0046396 A1 | 3/2003 | Richter et al. | 709/226 |
| 2003/0061260 A1 | 3/2003 | Rajkumar | 709/104 |
| 2003/0135609 A1 | 7/2003 | Carlson et al. | 709/224 |
| 2003/0187908 A1 | 10/2003 | Boucher | 709/103 |
| 2003/0236815 A1 * | 12/2003 | Brenner et al. | 709/104 |
| 2005/0160423 A1 * | 7/2005 | Bantz et al. | 718/1 |
| 2006/0294238 A1 * | 12/2006 | Naik et al. | 709/226 |

OTHER PUBLICATIONS

Paris Flegkas et Al., A policy-based quality of service management system for IP diffserv networks, Mar./Apr. 2002, IEEE, pp. 50-56.*

Chang Ho Choi et al. Adaptive bandwidth reservation mechanism using mobility probability in mobile multimedia computing environment, 2002, IEEE, pp. 76-85.*

Srinivas Vegesna, IP Quality of Service, Jan. 2001, Cisco Press, Chapter 1.*

Donald P. Pazel et al., Neptune: A dynamic resource allocation and planning system for cluster computing utility, May 2002, IEEE, 57-64.*

Dinesh C.Verma, Simplifying network admistration using policy-based management, Mar./Apr. 2002, IEEE, vol. 16, Issue: 2, pp. 20-26☐☐☐.*

* cited by examiner

| Policy | Resource(R1) | Resource(R2) | Resource(R3) | Resource(R4) |
|---|---|---|---|---|
| P1 | 10% | 20% | 70% | 20% |
| P2 | 20% | 20% | 10% | 10% |
| P3 | 30% | 50% | 10% | 20% |
| P4 | 40% | 10% | 10% | 50% |

302 = Policy column; 304 = Resource columns

| Application | Policy |
|---|---|
| A1 | P1 |
| A2 | P2 |
| A3 | P3 |
| A4 | P3 |
| A5 | P4 |
| A6 | P4 |
| other | P2 |

402 = Application column; 404 = Policy column

APPLICATION-AWARE SYSTEM THAT DYNAMICALLY PARTITIONS AND ALLOCATES RESOURCES ON DEMAND

FIELD OF THE INVENTION

The present invention is directed generally at a method for distributing resources to applications and specifically to an application-aware method for delivering a consistent quality of service to a plurality of similar applications.

BACKGROUND OF THE INVENTION

Network administrators are people who design, construct, and configure computer networks. Computer networks are efficient when the computer network resources (resources), such as processors, memory, and adapters, are constantly being used. One method that network administrators use to improve computer network efficiency is limiting the amount of resources for the applications running on the computer network. Network administrators may also limit the amount of resources in order to reduce the cost of designing, constructing, and configuring the computer network. By limiting the amount of resources, the resources present in the computer network are used more often by the applications running on the computer network.

One of the problems associated with limiting the amount of resources is a decrease in the quality of service on the computer network. The quality of service is defined as the time interval between request and delivery of a resource to an application. If an application requests a resource and the resource is readily available, then the resource may be allocated to the application quickly and the quality of service is high. However, if an application requests a resource and the resource is not available, the application has to wait for the resource to become available and the quality of service is low. Thus, an optimally configured computer network is highly efficient while maintaining a high quality of service.

One method for optimally configuring a computer network is to make the computer network application-aware. An application-aware network is one that does not arbitrarily allocate resources to requesting applications. Instead, an application-aware computer network allocates resources to requesting applications based on policies. For example, a prior art computer network may contain 100 GB of memory that the network can allocate to a plurality of applications. Two identical applications will achieve a desired result using 40 GB of memory but will achieve the desired result much faster if they are allocated a larger amount of memory. If the first application requests 75 GB of memory, then a prior art computer network would allocate 75 GB of memory to the first application. When the second application requests 75 GB of memory, the computer network only has 25 GB of memory to allocate to the second application. The second application has to wait until a minimum of 15 GB of memory becomes available before the application can begin its task. Thus, there is a large difference between the quality of service of the first application and the second application.

In an application-aware computer network, the network allocates the resources to the applications based on policies. The policies define the maximum amount of resources that can be allocated to an application. Returning to the above example, when the first application requests 75 GB of memory and the policy limits the memory allocation to 50 GB, the network only allocates 50 GB of memory to the first application. The network then has 50 GB of memory to allocate to the second application and a consistent quality of service is achieved for the two applications. A consistent quality of service is a highly desirable result in a network configuration. Therefore, a need exists for an application-aware method for allocating resources to applications running on a computer network that achieves a consistent quality of service for similar types of applications.

In complex computer networks, a plurality of customers may be running a plurality of applications on the computer network. In that case, it is important for the applications to differentiate between the more important applications and the applications of lesser importance. The more important applications should receive the majority of the resources while the remaining resources are allocated to the less important applications. The determination of relative importance should be made independent of the status of the customers associated with the applications. Therefore, a need exists for a method of allocating resources to applications in which the majority of the resources are allocated to the more important applications, regardless of the status of the customers associated with the applications.

The prior art has previously addressed the issue of improving the consistency of the quality of service of a computer network. For example, United States Patent Application Publication 2003/0187908 (the '908 application) entitled "Methods and Systems for Customer Based Resource Priority Control" discloses a customer-based system for resource management. The '908 application allows customers to purchase a certain level of service. The invention in the '908 application then allocates resources to the customer depending on the purchased level of service. However, the '908 application does not adequately meet the needs identified above. Specifically, the system of the '908 application differentiates levels of service based on the customer, not the application. The '908 application does not disclose a method for providing a consistent level of service to the same type of application when two customers, each with a different level of service, are running the same application. Therefore, a need exists for a method for providing a consistent quality of service to a plurality of applications run by a plurality of customers in a computer network.

Consequently, a need exists in the art for an application-aware method for allocating resources to applications running on a computer network that achieves a consistent quality of service for similar types of applications. The need extends to a method of allocating resources to applications in which the majority of the resources are allocated to the more important applications. Finally, a need exists for a method for providing a consistent quality of service to a plurality of applications run by a plurality of customers in a computer network, regardless of the status of the customers associated with the applications.

SUMMARY OF THE INVENTION

The present invention, which meets the needs identified above, is an application-aware method for allocating resources to applications based on a set of predefined policies. The software embodiment of the present invention comprises a Resource Allocation Program (RAP). The RAP is application-aware in that the RAP does not arbitrarily allocate resources to requesting applications. Instead, the RAP allocates resources to requesting applications based on predefined policies. The RAP allows a user to define the resource allocation for each policy in a Resource Allocation Table. The RAP also allows the user to associate the policies with the applications in a Policy Allocation Table. When an application requests resources, the RAP looks to the Policy Allocation Table to determine the policy associated with the application. The RAP then looks to the Resource Allocation Table to determine the permissible resource allocation for the application associated with the policy. The RAP then allocates the resources to the requesting application based on the resource allocation identified in the Resource Allocation Table. Thus, the present invention is able to maintain a consistent quality of service for similar applications regardless of the status of the customers associated with the applications or the timing of the applications' resource requests.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is an illustration of the Resource Allocation Table of the present invention;

FIG. 5 is an illustration of the Policy Allocation Table of the present invention.

DETAILED DESCRIPTION OF THE PREFERRED EMBODIMENT

As used herein, the term "allocate" shall mean to temporarily lease a system's resources to an application in order for the application to perform its specific task or achieve its desired result.

As used herein, the term "application" shall mean a computer program that leases resources to perform a specific task or compute a desired result.

As used herein, the term "application-aware" shall mean a computer program that allocates resources to applications based on policies and not based on the customers associated with the applications.

As used herein, the term "computer" shall mean a machine having a processor, a memory, and an operating system, capable of interaction with a user or other computer, and shall include without limitation desktop computers, notebook computers, personal digital assistants (PDAs), servers, handheld computers, and similar devices.

As used herein, the term "quality of service" shall mean the time interval between request and delivery of a resource to an application.

As used herein, the term "policy" shall mean a set of rules that define the maximum allocation of resources for an application.

As used herein, the term "resource" shall mean a component of a system that is used by an application in order for the application to perform its specific task or achieve its desired result.

As used herein, the term "system" shall mean a computer, computer network, computer file, computer operating system, or computer program that allocates resources to applications.

Figure 1:
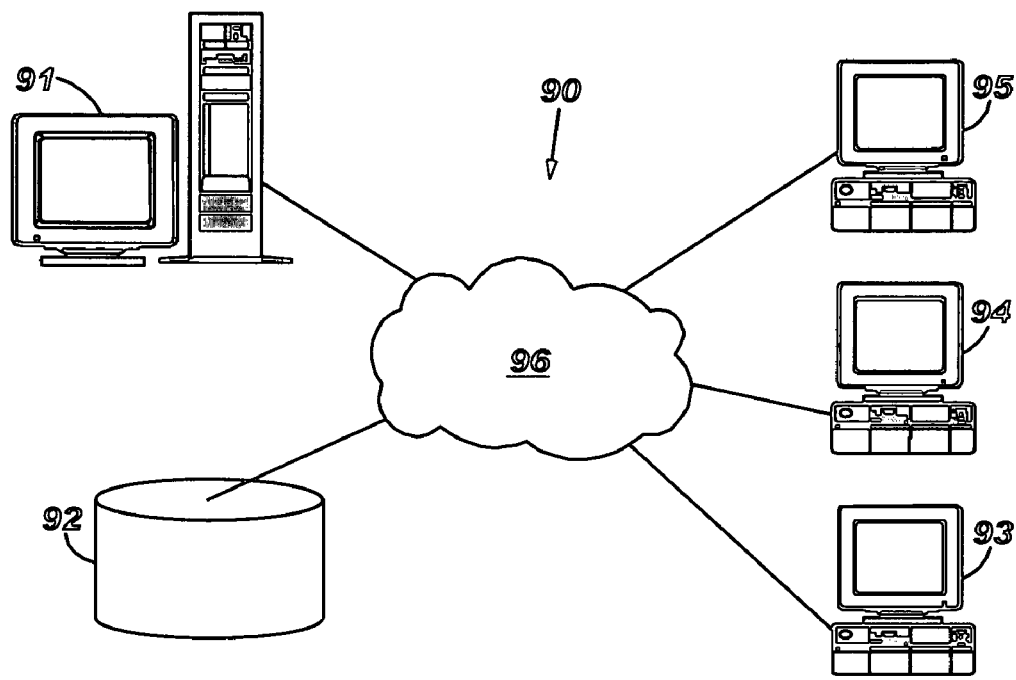
FIG. 1 is an illustration of a computer network used to implement the present invention.

FIG. 1 is an illustration of computer network 90 associated with the present invention. Computer network 90 comprises local computer 95 electrically coupled to network 96. Local computer 95 is electrically coupled to remote computer 94 and remote computer 93 via network 96. Local computer 95 is also electrically coupled to server 91 and database 92 via network 96. Network 96 may be a simplified network connection such as a local area network (LAN) or may be a larger network such as a wide area network (WAN) or the Internet. Furthermore, computer network 90 depicted in FIG. 1 is intended as a representation of a possible operating network containing the present invention and is not meant as an architectural limitation.

Figure 2:
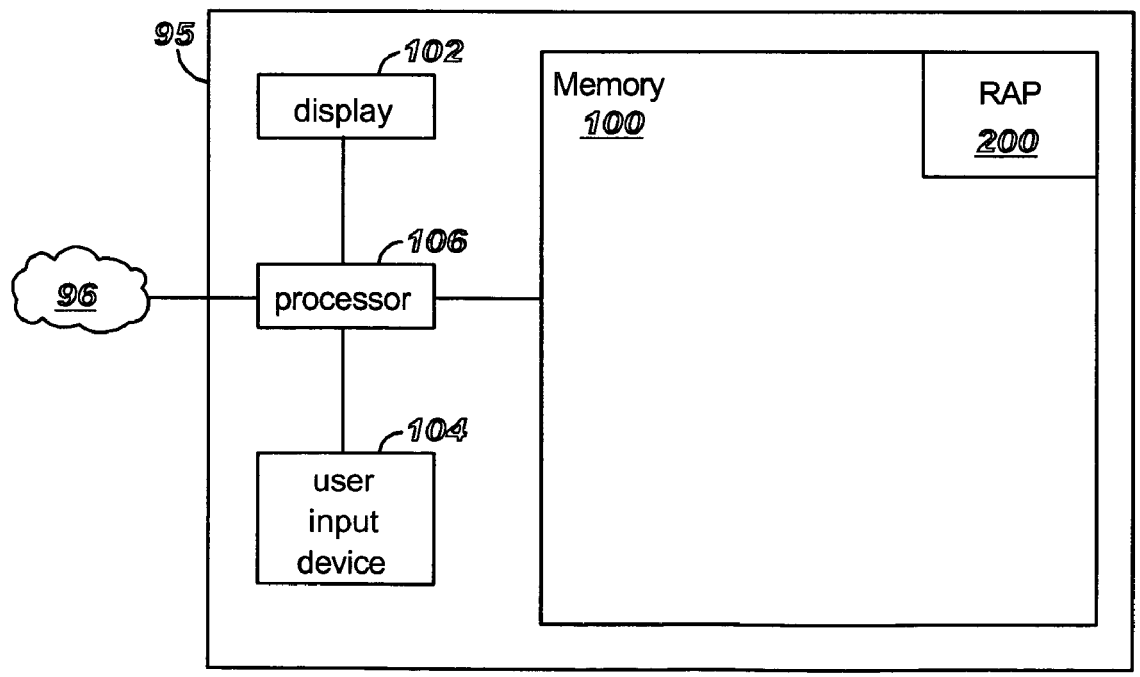
FIG. 2 is an illustration of a computer, including a memory and a processor, associated with the present invention.

The internal configuration of a computer, including connection and orientation of the processor, memory, and input/output devices, is well known in the art. The present invention is a methodology that can be embodied in a computer program. Referring to FIG. 2, the methodology of the present invention is implemented on software by Resource Allocation Program (RAP) 200. RAP 200 described herein can be stored within the memory of any computer depicted in FIG. 1. Alternatively, RAP 200 can be stored in an external storage device such as a removable disk, a CD-ROM, or a USB storage device. Memory 100 is illustrative of the memory within one of the computers of FIG. 1. Processor 106 can execute the instructions contained in RAP 200. Processor 106 is also able to display data on display 102 and accept user input on user input device 104. Processor 106, user input device 104, display 102, and memory 100 are part of a computer such as local computer 95 in FIG. 1. Processor 106 can communicate with other computers via network 96.

In alternative embodiments, RAP 200 can be stored in the memory of other computers. Storing RAP 200 in the memory of other computers allows the processor workload to be distributed across a plurality of processors instead of a single processor. Further configurations of RAP 200 across various memories are known by persons of ordinary skill in the art. The present invention may be a method, a stand alone computer program, or a plug-in to an existing computer program. Persons of ordinary skill in the art are aware of how to configure computer programs, such as those described herein, to plug into an existing computer program.

Figure 3:
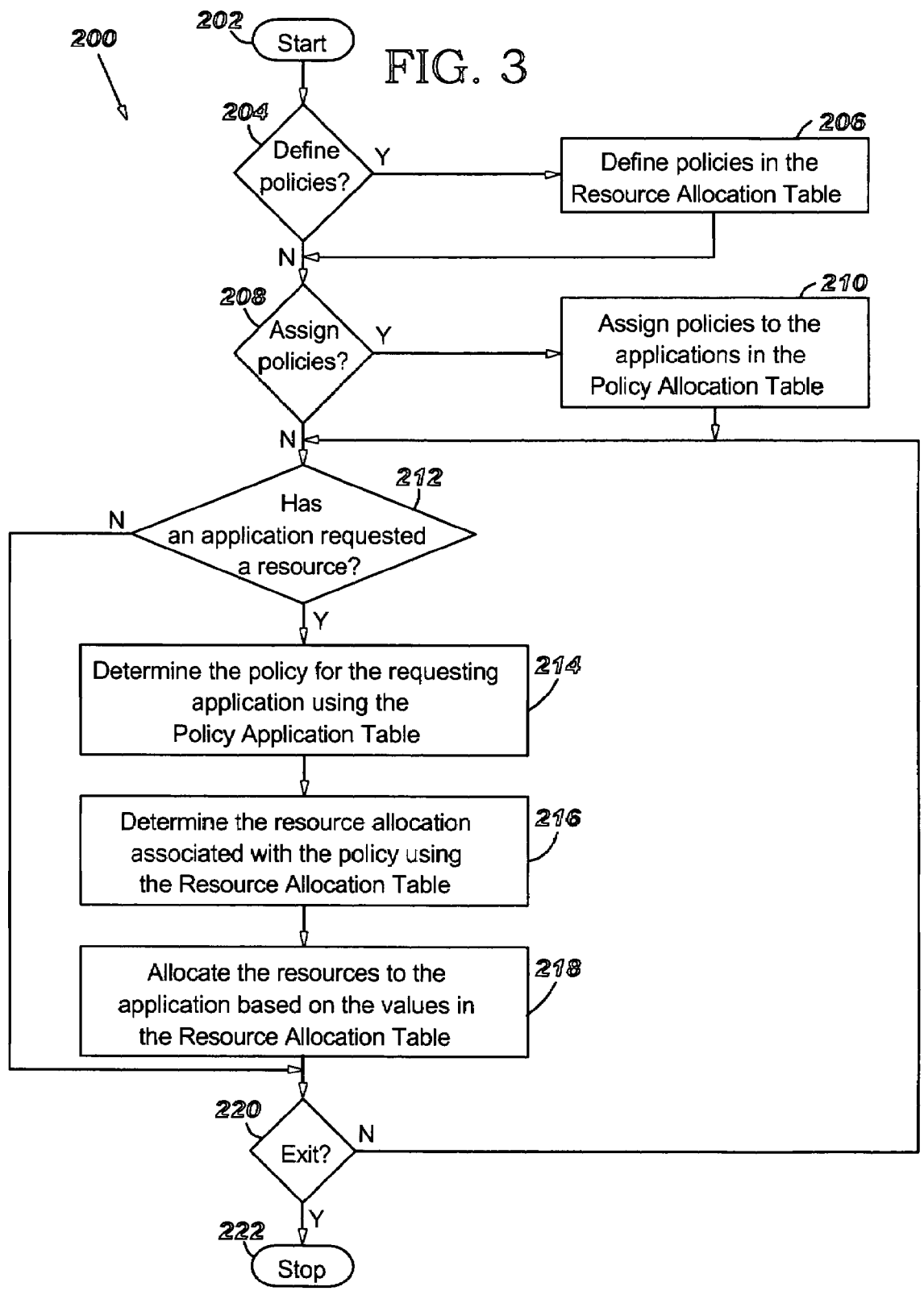
FIG. 3 is an illustration of the logic of the Resource Allocation Program (RAP) of the present invention.

FIG. 3 illustrates the logic of Resource Allocation Program (RAP) 200 of the present invention. RAP 200 is a program that allocates system resources to applications based on a plurality of policies. The system may be a computer network, a virtual machine such as a Java Virtual Machine (JVM) or a .NET Common Language Runtime (CLR), an operating system, a database system, a messaging system, or an application server. Persons of ordinary skill in the art are aware of other types of systems that could employ the concepts of the present invention. RAP 200 starts when invoked by a user (202). For the illustrative purposes herein, the user may be the network administrator. RAP 200 then makes a determination whether the user wants to define the policies (204). The user may indicate a desire to define policies by selecting a "Define Policies" option from a drop down menu. If the user does not want to define the policies, then RAP 200 proceeds to step 208. If the user wants to define the policies, then the user defines the policies in Resource Allocation Table 300 (206). In defining the policies, the user may add, delete, or modify any number of policies, resources, and/or resource allocations. An example of one embodiment of Resource Allocation Table 300 is depicted in FIG. 4. RAP 200 then proceeds to step 208.

At step 208, RAP 200 then makes a determination whether the user wants to assign the policies to the applications (208). The user may indicate a desire to assign policies by selecting an "Assign Policies" option from a drop down menu. If the user does not want to assign the policies to the applications, then RAP 200 proceeds to step 212. If the user wants to assign the policies to the applications, then the user assigns the policies to the applications in Policy Allocation Table 400 (210). In assigning the policies, the user may add, delete, or modify any number of policies and/or applications. An example of one embodiment of Policy Allocation Table 400 is depicted in FIG. 5. RAP 200 then proceeds to step 212.

At step 212, RAP 200 determines if an application has requested a resource (212). If an application has not requested a resource, then RAP 200 proceeds to step 220. If an application has requested a resource, then RAP 200 determines the policy associated with the application using Policy Application Table 400 (214). RAP 200 then determines the resource allocation associated with the policy using Resource Allocation Table 300 (216). RAP 200 then allocates the resources to the application based on the resource allocation values in Resource Allocation Table 300 (218). The present invention can be configured such that the invention allocates the amount of resources available to the application, subject to the limitations defined in Resource Allocation Table 300. For example, if 30 GB of memory is available and the applicable policy limits resource allocation to 40 GB of memory, the RAP 200 immediately allocates the 30 GB of available memory to the application. Alternatively, the present invention can be configured such that the invention waits until the amount of resources defined in Resource Allocation Table 300 are available, and then allocates the entire amount to the requesting application. For example, if 30 GB of memory is available and the policy limits resource allocation to 40 GB of memory, the RAP 200 waits until another 10 GB of memory is available and then allocates the entire 40 GB of memory to the application. Persons of ordinary skill in the art are aware of situations in which each of these distribution methodologies are advantageous in resource allocation. RAP 200 then determines if the user has indicated a desire to exit (220). The user may indicate a desire to exit by closing RAP 200. If the user does not want to exit RAP 200, then RAP 200 returns to step 212. If the user wants to exit RAP 200, RAP 200 ends (222).

FIG. 4 is an illustration of Policy Application Table 300. Policy Application Table 300 is a table that defines the resource allocation for each policy. Policy Allocation Table 300 contains a list of policies 302 and the resource allocation 304 associated with each policy 302. Each line of Resource Allocation Table 300 defines the specific amount of resources that is associated with the policy. For example, policy P1 is allowed to use up to ten percent of Resource (R1), up to twenty percent of Resource (R2), seventy percent of Resource (R3), and twenty percent of Resource (R4).

In the Resource Allocation Table 300, the user may configure any number of resources within resource allocation 304. For example, if the resources are database resources, Resource (R1) may be the database heap size, Resource (R2) may be the SQL statement heap size, Resource (R3) may be lock lists per application, and Resource (R4) may be the maximum database file per application. Persons of ordinary skill in the art are aware of other types of computer and database resources such as processors, memory, adapters, and I/O ports.

Resource Allocation Table 300 allows the user to specify the maximum amount of resources allocated to a particular requesting application. If desired, the user may also configure a maximum number of policies and default policy for the system. For example, the user could configure the default policy to be the policy P1. In addition, the user could configure the systems to accept a maximum of four policies. Persons of ordinary skill in the art are aware of other alternative methods for configuring the present invention.

FIG. 5 is an illustration of Resource Allocation Table 400. Resource Allocation Table 400 is a table that defines the policy associated with each application. Resource Allocation Table 400 contains a list of applications 402 and the policies 404 associated with the applications 402. Applications 402 are completely independent of the customers they are associated with. Each line in Resource Allocation Table 400 associates a specific policy 404 with a specific application 402. For example, application A1 is allocated resources according to policy P1. Therefore, application A1 will be allocated up to ten percent of Resource (R1), up to twenty percent of Resource (R2), seventy percent of Resource (R3), and twenty percent of Resource (R4). The user may configure any application with any policy. The user may also define a policy for applications not listed in Resource Allocation Table 400, as illustrated in the last line of Resource Allocation Table 400 in FIG. 5.

Figure 6:
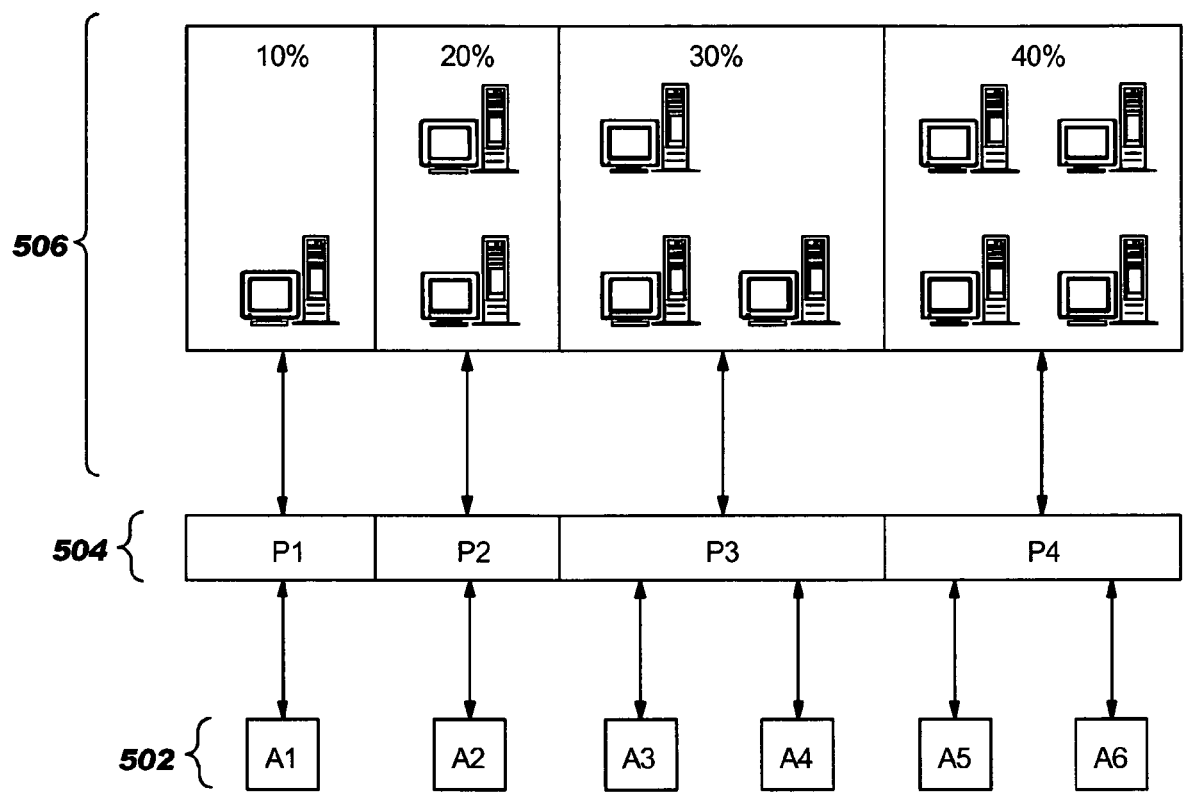
FIG. 6 is an illustration of the interaction between the applications, the policies, and a resource of the present invention.

FIG. 6 illustrates the interaction of applications 502, policies 504, and resources 506. Each application 502 is associated with a specific policy 504. Each policy 504 defines an amount of resources 506 that may be allocated to requesting applications 502. Although FIG. 6 only depicts one resource, Resource (R1), associated with the policies, each policy actually defines the allocation of a plurality of resources. The applications can connect to the database by including a policy identifier in the connection string as shown below:

```
Connection con=Device Manager.getConnection
    (driver, userid, password, policy_id);

Connection con=Device Manager.getConnection (databaseURL, userid, password, policy_id); or Connection con=Device Manager.getConnection
    ("jdbc: db2: MPS3DBN", "A1", "ibm", P1).
```

If an application does not specify the policy in the connection string, then the default policy will be used to allocate the resources to the application. An example of a connection string without a policy identifier is:

```
Connection con=Device Manager.getConnection
    ("jdbc: db2: MPS3DBN", "A1", "ibm").
```

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. The present invention encompasses all equivalent relationships to those illustrated in the drawings and described in the specification. The novel spirit of the present invention is still embodied by reordering or deleting some of the steps contained in this disclosure. The spirit of the invention is not meant to be limited in any way except by proper construction of the following claims.

What is claimed is:

1. A method for allocating a plurality of resources to a plurality of applications, the method comprising:
    configuring a system with a resource allocation program;
    wherein the resource allocation program performs steps comprising:
        determining whether a first application of the plurality of applications has requested the resources;
        responsive to determining that the first application has requested the resources, determining a policy associated with the first application using a policy allocation table;
        responsive to determining the policy associated with the first application, determining a resource allocation associated with the policy using a resource allocation table; and
        responsive to determining the resource allocation associated with the policy, allocating a portion of the plurality of resources to the first application based on the resource allocation associated with the policy;
    wherein the policy is one of a plurality of policies; and
    wherein the resource allocation program allocates all of a plurality of currently available resources to the application, subject to a plurality of limitations defined in resource allocation table for the policy associated with the first application.

2. The method of claim 1 further comprising:
    determining when a user wants to define one of the plurality of policies; and
    responsive to determining that the user wants to define one of the plurality of policies, accepting a user definition, a modification, or a deletion of one of the plurality of policies in the resource allocation table.

3. The method of claim 1 further comprising:
    determining if a user wants to assign a plurality of policies to the plurality of applications; and
    responsive to determining that the user wants to assign the plurality of policies to the plurality of applications, accepting a user assignment, a modification, or a deletion of at least a plurality of associations between the plurality of policies and the plurality of applications in the resource allocation table.

4. The method of claim 1 further comprising:
    wherein each application of the plurality of applications is associated with one of a plurality of customers; and
    wherein the resource allocation program allocates the portion of the plurality of resources to the first application based upon the policy associated with the first application and independent of a status of a customer associated with the first applications.

5. The method of claim 1 wherein a consistent quality of service is achieved for substantially all of the applications associated with each policy.

6. The method of claim 1 wherein the resource allocation program waits until an entire amount of resources defined in the resource allocation table is available, and then the resource allocation program allocates the entire amount of resources defined in the resource allocation table for the policy to the first application.

7. The method of claim 1 wherein the system is a computer network.

8. The method of claim 1 wherein the system is a computer file.

9. The method of claim 1 wherein the system is a computer operating system.

10. The method of claim 1 wherein the system is a computer program.

11. The method of claim 1 wherein the system is a virtual machine.

* * * * *